US012591316B2

(12) United States Patent
Feng et al.

(10) Patent No.: US 12,591,316 B2
(45) Date of Patent: Mar. 31, 2026

(54) ACCESSORY BODY AND ACCESSORY

(71) Applicant: Beijing Zitiao Network Technology Co., Ltd., Beijing (CN)

(72) Inventors: Zhao Feng, Beijing (CN); Qinglin Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/819,417

(22) Filed: Aug. 29, 2024

(65) Prior Publication Data

US 2025/0076994 A1 Mar. 6, 2025

Related U.S. Application Data

(63) Continuation of application No. PCT/CN2024/113815, filed on Aug. 22, 2024.

(30) Foreign Application Priority Data

Aug. 30, 2023 (CN) .......................... 202311110533.0

(51) Int. Cl.
*G06F 3/03* (2006.01)
*G02B 19/00* (2006.01)
*G06F 3/0346* (2013.01)

(52) U.S. Cl.
CPC .......... *G06F 3/0308* (2013.01); *G06F 3/0346* (2013.01); *G02B 19/0047* (2013.01)

(58) Field of Classification Search
CPC .. G06F 3/0308; G06F 3/0346; G02B 19/0047
See application file for complete search history.

(56) References Cited

U.S. PATENT DOCUMENTS

| | | | | |
|---|---|---|---|---|
| 10,409,392 B1* | 9/2019 | Allin | ..................... | G06F 3/0308 |
| 2007/0100325 A1* | 5/2007 | Jutras | ..................... | A61B 90/39 606/1 |

(Continued)

FOREIGN PATENT DOCUMENTS

| | | |
|---|---|---|
| CN | 110837295 A | 2/2020 |
| CN | 112451962 A | 3/2021 |

(Continued)

OTHER PUBLICATIONS

International Search Report and Written Opinion for International Application No. PCT/CN2024/113815, mailed Oct. 23, 2024, 18 pages.

*Primary Examiner* — Ariel A Balaoing

(57) ABSTRACT

The present application relates to the technical field of electronic devices, and in particular, to an accessory body and an accessory. The height of the accessory body is less than the contour diameter of the projection plane, and a projection of the accessory body on a plane which is perpendicular to a height direction of the accessory body is the projection plane, and the accessory body has at least one first light-emitting element, and light of the first light-emitting element is emitted from a peripheral side of the accessory body. In this way, it can make it easy to put on the accessory body. Moreover, it can make it easy to track and position the accessory body through light of the first light-emitting element, improve the accuracy of positioning and enhance the user experience.

20 Claims, 6 Drawing Sheets

(56)     References Cited

U.S. PATENT DOCUMENTS

| | | | | |
|---|---|---|---|---|
| 2013/0050826 | A1* | 2/2013 | Guyan | G06F 3/0308 |
| | | | | 359/518 |
| 2016/0364910 | A1* | 12/2016 | Higgins | A63F 13/213 |
| 2017/0086941 | A1* | 3/2017 | Marti | A61B 90/39 |
| 2019/0278098 | A1* | 9/2019 | Prest | H04M 1/0283 |
| 2019/0302898 | A1* | 10/2019 | Holverson | G06F 3/03543 |
| 2020/0116477 | A1* | 4/2020 | Fukuda | G01B 11/26 |
| 2020/0118293 | A1* | 4/2020 | Saito | G01B 11/002 |
| 2022/0187904 | A1 | 6/2022 | Thon et al. | |
| 2023/0025118 | A1* | 1/2023 | Wu | G06T 7/246 |
| 2023/0106457 | A1* | 4/2023 | Jo | G06T 7/50 |
| | | | | 345/156 |
| 2023/0222830 | A1* | 7/2023 | Lopez Mendez | G06T 7/50 |
| | | | | 382/154 |
| 2023/0236672 | A1* | 7/2023 | Ohori | G06F 3/0219 |
| | | | | 345/156 |

FOREIGN PATENT DOCUMENTS

| | | |
|---|---|---|
| CN | 114859980 A | 8/2022 |
| WO | 2020075143 A1 | 4/2020 |

* cited by examiner

ACCESSORY BODY AND ACCESSORY

CROSS REFERENCE TO RELATED APPLICATIONS

This application is a Continuation Application of International Patent Application No. PCT/CN2024/113815 filed Aug. 22, 2024, which claims the priority to the Chinese Application No. 202311110533.0 filed Aug. 30, 2023, the disclosures of which are hereby incorporated by reference in their entireties.

FIELD

The present disclosure relates to the technical field of electronic devices, and in particular, to an accessory body and an accessory.

BACKGROUND

Virtual reality technology has become increasingly mature, and the application scenarios of wearable devices continuously expand to a wider range, such as movies, games, and social contact.

Currently, the mainstream body trackers on the market are based on the body (legs, waist, arms) tracking and identification functionality, that is, the body tracker is tied to the body for identification and positioning. However, due to inaccurate positioning, the body tracker will result in poor user immersion and experience during use, so the user experience is bad.

SUMMARY

In order to solve the foregoing technical problems, the present disclosure provides an accessory body and an accessory.

In a first aspect, the present disclosure provides an accessory body, wherein a height of the accessory body is less than a contour diameter of a projection plane that is a projection of the accessory body on a plane which is perpendicular to a height direction of the accessory body, and the accessory body has at least one first light-emitting element, and light of the first light-emitting element is emitted from a peripheral side of the accessory body.

Optionally, the accessory body is a disc-shaped structure, and the height of the accessory body is less than a diameter of the projection plane; and/or a first light concentrator, corresponding to each first light-emitting element, is disposed on the accessory body, and the first light concentrator has a light concentrating cavity for concentrating light.

Optionally, an IMU sensor is disposed within the accessory body.

Optionally, the accessory body comprises a body structure, wherein at least one first light-emitting element is disposed at a top edge of the body structure, and a light emitting direction is inclined towards the peripheral side of the accessory body with respect to the height direction of the accessory body, and/or wherein at least one first light-emitting element is disposed on a peripheral side of the body structure.

Optionally, the accessory body further comprises a light-transmitting cover, and the light-transmitting cover covers the body structure.

Optionally, shapes of first polygons formed by connecting lines of any at least three of adjacent first light-emitting elements are different from each other; or the accessory body is used for connecting to an accessory base, wherein in a case that the accessory body is connected to the accessory base, shapes of first polygons formed by connecting lines of any at least three of exposed adjacent first light-emitting elements are different from each other.

Optionally, eight of the first light-emitting elements are disposed on the body structure, and shapes of triangles formed by connecting lines of any at least three of the adjacent first light-emitting elements are different from each other.

In a second aspect, the present disclosure provides an accessory, comprising an accessory base and an accessory body as described in the first aspect.

Optionally, the accessory base is connected to the accessory body, at least one second light-emitting element is disposed on the accessory base, and connecting lines between the at least one second light-emitting element and the at least one first light-emitting element form a second polygon.

Optionally, the accessory base at least comprises a first side and a second side, and the first side and the second side are disposed opposite to each other, and the first side and the second side each correspond to at least one second light-emitting element; and connecting lines between the at least one second light-emitting element of the first side and the at least one first light-emitting element form a second polygon, and connecting lines between the at least one second light-emitting element of the second side and the at least one first light-emitting element form another second polygon, and the two second polygons have the same size and shape.

Optionally, two second light-emitting elements are disposed on each of the first side and the second side respectively, a second polygon formed by connecting lines between the two second light-emitting element of the first side and one of the first light-emitting elements and a second polygon formed by connecting lines between the two second light-emitting element of the second side and one of the first light-emitting elements have the same size and shape.

Optionally, a second light concentrator, corresponding to each second light-emitting element, is disposed on the accessory base, and the second light concentrator has a light concentrating cavity for concentrating light.

Optionally, the accessory body and the accessory base are detachably connected, and at least part of a peripheral side of the accessory body is exposed.

Optionally, a first plug-in connector and a first snap-on connector are disposed on the accessory body, and the accessory base comprises a base body, and a second plug-in connector and a snap-on connection structure, and the second plug-in connector is rotatably disposed on the base body and is capable of being plug-in-connected to the first plug-in connector, and the snap-on connection structure is capable of being snap-on-connected to the first snap-on connector or disengaged from snap-on-connection with the first snap-on connector; and in a case that the first plug-in connector and the second plug-in connector are plug-in-connected, the accessory body is pressed to cause the second plug-in connector to rotate such that the first snap connector is snap-on-connected with the snap-on connection structure.

Optionally, the first plug-in connector and the second plug-in connector are electrical connectors, and the electrical connectors are configured to implement signal transmission and/or electrical transmission between the accessory body and the accessory base; or connectors are disposed on both the accessory base and the accessory body, and in a case that the first snap-on connector and the snap-on connection structure are snap-on-connected, two connectors implement signal transmission and/or electrical transmission between the accessory body and the accessory base.

Optionally, the snap-on connection structure comprises a second snap-on connector and a driving component, and the second snap-on connector is slidably disposed on the base body, and the second snap-on connector comprises a snap-on connection position capable of being snap-on-connected with the first snap connector and an unlocking position capable of being released from the snap-on connection with the first snap connector, and the driving component is capable of driving the first snap connector to switch between the snap-on connection position and the unlocking position.

Optionally, the driving component comprises a first elastic part, one end of the first elastic part is connected to the base body, and another end is connected to the second snap-on connector, and the second snap-on connector is located at the snap-on connection position in a natural state.

Optionally, the driving component further comprises a driving part, and the driving part comprises a first inclined plane, and the second snap-on connector comprises a second inclined plane fitting with the first inclined plane; and the driving part, in a case that moving downward along the second inclined plane, is capable of causing the second snap connector to move from the snap-on connection position to the unlocking position and compress the first elastic part.

Optionally, the accessory base further comprises a second elastic part, and the second elastic part is deformed and provides a lifting force for the second plug-in connector to rotate to lift the accessory body in a direction away from the accessory base Compared with the prior art, the technical solution provided by the embodiments of the present disclosure has the following advantages:

By setting the height of the accessory body to be less than the contour diameter of the projection plane, the accessory body is a flat structure, which makes it easy to put on the accessory body. Moreover, the accessory body comprises at least one first light-emitting element, and light of the first light-emitting element is emitted from the peripheral side of the accessory body, which makes it easy to track and position the accessory body through light of the first light-emitting element. In particular, when the accessory body is worn at a position far away from a headset and fits somewhere on the limb or has a special angle relative to the headset, the camera on the headset can still collect the light spots on the peripheral side of the accessory body and track the position of the accessory body, which improves the accuracy of positioning and enhances the user experience.

BRIEF DESCRIPTION OF THE DRAWINGS

The accompanying drawings herein are incorporated into the specification and constitute part of the specification, depict the embodiments of the present disclosure and are used to explain the principles of the present disclosure together with the specification.

To illustrate the technical solution in the embodiments of the present application or in the prior art more clearly, a brief introduction is presented below to the accompanying drawings to be used to the description of the embodiment or the prior art. It is obvious that the accompanying drawings in the following description are merely some of the embodiments disclosed in the present application. Those of ordinary skill in the art may further derive other figures from these accompanying drawings without the exercise of any inventive skill.

Wherein

Figure 1:
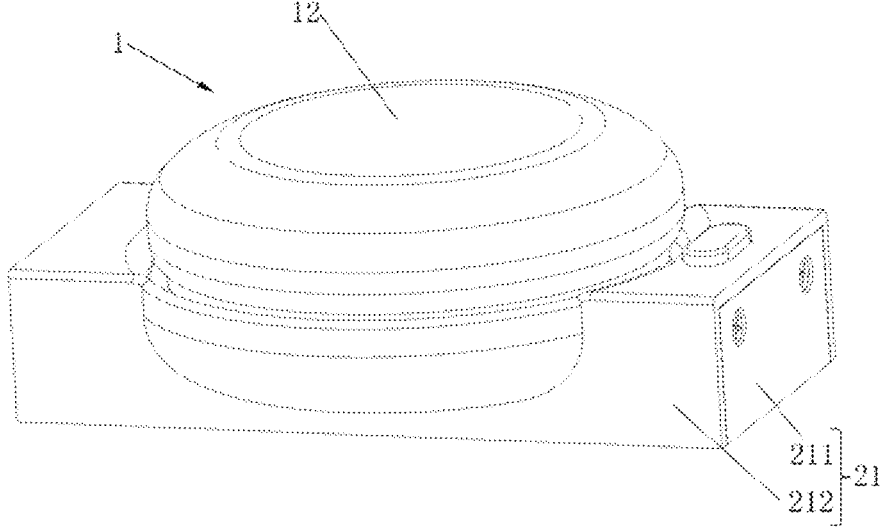
FIG. 1 illustrates a structural schematic diagram of an accessory according to an embodiment of the present disclosure.

1. accessory body; 11. body structure; 111. first plug-in connector; 12. light-transmitting cover; 121. first snap-on connector; 101. first light-emitting element; 1011. light-emitting element 1; 1012. light-emitting element 2; 1013. light-emitting element 3; 1014. light-emitting element 4; 1015. light-emitting element 5; 1016. light-emitting element 6; 1017. light-emitting element 7; 1018. light-emitting element 8; 13. first light concentrator;

2. accessory base; 21. base body; 201. mounting cavity; 202. second light-emitting element; 211. outer casing; 2111. limiting surface; 212. inner casing; 2121. accommodating cavity; 22. second plug-in connector; 221. limiting portion; 23. snap-on connection structure; 231. second snap-on connector; 232. first elastic part; 233. driving part; 24. second elastic part; 25. connector; 26. second light concentrator.

DETAILED DESCRIPTION OF EMBODIMENTS

For a clearer understanding of the above objectives, features and advantages of the present disclosure, the solution of the present disclosure will be further described below. It is to be noted that the embodiments and features in the embodiments of the present disclosure may be combined with each other without conflict.

Many specific details are set forth in the following description in order to facilitate a full understanding of the present disclosure, but the present disclosure can further be implemented in other ways different from those described herein. Apparently, the embodiments in the specification are merely part of rather than all the embodiments of the present disclosure.

An accessory body 1 and an accessory of the present disclosure may be applied in various scenarios. In some embodiments, the accessory body 1 and the accessory of the present disclosure are applied to an extended reality (XR for short) scenario. Extended reality refers to all real and virtual combined environments and human-computer interactions generated by computer technology and wearable devices, which includes virtual reality VR, augmented reality AR, and mixed reality MR, among other forms. The present disclosure can be used in cooperation with an extended reality headset in an extended reality scenario.

Figure 2:
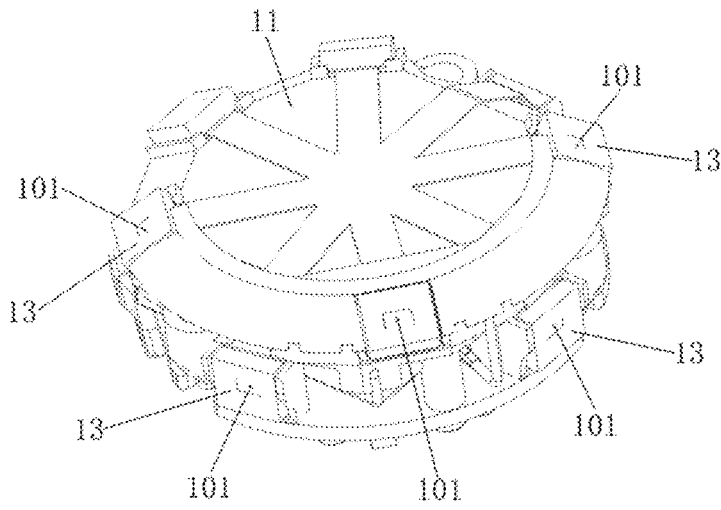
FIG. 2 illustrates a structural schematic diagram of a body structure according to an embodiment of the present disclosure.

As shown in FIGS. 1 and 2, the present disclosure provides the accessory body 1, a height of the accessory body 1 is less than a contour diameter of a projection plane that is a projection of the accessory body 1 on a plane which is perpendicular to a height direction of the accessory body 1, the accessory body 1 has at least one first light-emitting element 101, and light of the first light-emitting element 101 is emitted from a peripheral side of the accessory body 1.

It may be understood that by setting the height of the accessory body 1 to be less than the contour diameter of the projection plane, the accessory body 1 is a flat structure, which makes it easy to wear the accessory body 1. The accessory body 1 has at least one first light-emitting element 101, and light of the first light-emitting element 101 is emitted from the peripheral side of the accessory body 1, which makes it easy to track and position the accessory body 1 through the light of the first light-emitting element 101. In particular, when the accessory body 1 is worn at a position far away from a headset and fits somewhere on the limb or has a special angle relative to the headset device, the camera on the headset can still collect the light spots on the peripheral side of the accessory body 1 and track the position of the accessory body 1, which improves the accuracy of positioning and enhances the user experience.

It is to be noted that the first light-emitting element 101 may emit visible or invisible light to form light spots or patterns, and the camera on the headset, after collecting the light spots or patterns formed by the first light-emitting element 101, may identify the relative position and/or attitude with respect to the accessory body 1 based on relevant algorithms, thereby realizing the tracking of the accessory body 1.

Further, the accessory body 1 is provided with an IMU sensor. The IMU sensor is a sensor which is mainly used to detect and measure acceleration and rotational motion, wherein IMU stands for inertial measurement unit. The IMU sensor works in conjunction with the foregoing first light-emitting element 101 for more accurate tracking of data from the optical and inertial measurement unit.

As an example, in a specific implementation, with reference to FIG. 1, the accessory body 1 is a disc-shaped structure, and the height of the accessory body 1 is less than the diameter of the projection plane. As such, the accessory body 1 can be easily put on, coupled with aesthetic effect.

As shown in FIG. 2, in some embodiments, a first light concentrator 13, corresponding to each first light-emitting element 101, is disposed on the accessory body 1, the first light concentrator 13 having a light concentrating cavity for concentrating light.

It may be understood that since the first light-emitting element 101 is disposed within the light concentrator of the first light concentrator 13, light emitted from the first light-emitting element 101 can be concentrated by the light concentrating cavity. The light spot formed by the first light-emitting element 101 may be avoided from being too large and affecting the tracking and positioning, which helps to improve the accuracy of the tracking and positioning by the first light-emitting element 101.

As an example, in a specific implementation, the first light concentrator 13 may optionally be foam with grooves.

In some embodiments, the accessory body 1 comprises a body structure 11, wherein the at least one first light-emitting element 101 is disposed at a top edge of the body structure 11, and a light emitting direction is inclined towards the peripheral side of the accessory body 1 with respect to the height direction of the accessory body 1, and/or wherein the at least one first light-emitting element 101 is disposed on a peripheral side of the body structure 11.

That is, the position where the first light-emitting element 101 has three different forms. One is that the first light-emitting elements 101 are all disposed at the top edge of the body structure 11, and a light emitting direction of the first light-emitting element 101 is inclined towards the peripheral side of the accessory body 1 with respect to the height direction of the accessory body 1; one is that the first light-emitting elements 101 are all disposed on a peripheral side of the body structure 11; and the last one is that at least one of the first light-emitting element 101 is disposed at the top edge of the body structure 11, and at least one of the first light-emitting element 101 is disposed on the peripheral side of the body structure 11.

It may be understood that when the first light-emitting element 101 is disposed at the top edge of the body structure 11, it is possible to capture the light emitted by the first light-emitting element 101 not only at the top of the accessory body 1, but also at the peripheral side of the accessory body 1, with a larger trackable range.

As an example, in a specific implementation, with reference to FIG. 2, the first light-emitting elements 101 are disposed at the top edge of the body structure 11 and also at the peripheral side of the body structure 11. As such, the first light-emitting elements 101 are disposed in a staggered way in the height direction of the body structure 11, which helps to increase the probability of tracking the light of the first light-emitting element 101 and thus helps to improve the accuracy of tracking and positioning of the accessory body 1.

As shown in FIGS. 1 and 2, the accessory body 1 further comprises a light-transmitting cover 12, the light-transmitting cover 12 covering the body structure 11.

It may be understood that by arranging the light-transmitting cover 12, the first light-emitting element 101 on the body structure 11 can be protected without affecting the light emission of the first light-emitting element 101.

As an example, in a specific implementation, the first light-emitting element 101 is an infrared lamp, and the light-transmitting cover body 12 allows infrared light to pass through. Or light emitted by the first light-emitting element 101 may further be visible light, or invisible light other than infrared light, such as near-infrared light, etc., at which point the light-transmitting cover 12 is correspondingly disposed based on the characteristics of the light emitted by the first light-emitting element 101.

In some embodiments, shapes of first polygons formed by connecting lines of at least any three of the adjacent first light-emitting elements (101) are different to each other. As such, it is conducive to identifying the accessory body 1 and judging the posture of the accessory body 1 through the first polygon, especially when the accessory body 1 is used separately.

It is to be noted that at least three adjacent first light-emitting elements 101 are visible at any viewing angle in the circumferential direction of the accessory body 1. That is, at least three first light-emitting elements 101 are visible at any viewing angle in the circumferential direction of the accessory body 1; moreover, since first polygons formed by any at least three adjacent first light-emitting elements 101 are different to each other, this is conducive to tracking and positioning the accessory body 1 and judging the posture of the accessory body 1 through polygons.

The reason for providing that at least any three adjacent first light-emitting elements 101 constitute a first polygon is that light spots or patterns formed by at least three first light-emitting elements 101 are required to calculate the relative posture of the accessory body 1 relative to the headset. The first polygon is at least a triangle.

In other embodiments, the accessory body 1 is used for connecting to the accessory base 2. When the accessory body 1 is connected to the accessory base 2, first polygons formed by connecting lines of at least any three exposed, adjacent first light-emitting elements 101 are different to each other.

It may be understood that when the accessory body 1 is connected to the accessory base 2 for use as a whole, the accessory base 2 may block part of the first light-emitting element 101. At this time, first polygons formed by connecting lines of at least any three exposed, adjacent first light-emitting elements 101 are different to each other. As such, it is possible to realize the tracking and positioning of the accessory body 1 and judge the posture of the accessory body 1 through the first polygons.

As an example, in a specific implementation, with reference to FIG. 2, eight first light-emitting elements 101 are disposed on the body structure 11, and shapes of triangles formed by connecting lines of any three adjacent first light-emitting elements 101 are different to each other.

It may be understood that the tracking and positioning of the accessory body 1 is performed through three adjacent first light-emitting elements, the three first light-emitting elements 101 may form three light spots which are triangularly distributed; furthermore, since shapes of the triangles formed by any three adjacent light spots are different to each other, the posture of the accessory body 1 can be determined by identifying the shapes of the triangles.

Figure 3:
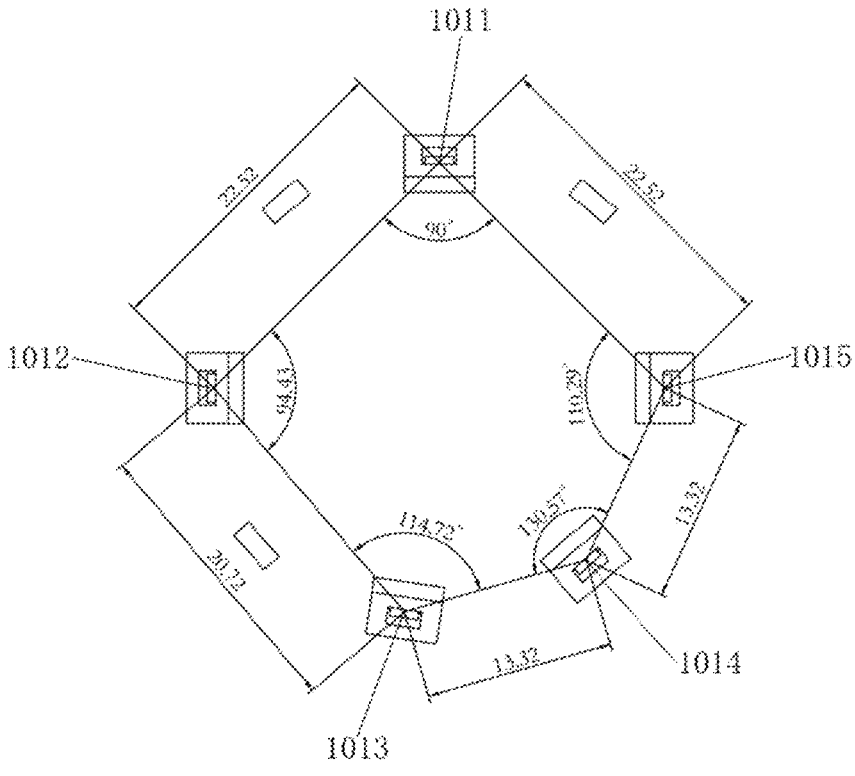
FIG. 3 illustrates a schematic diagram of a first arrangement of a first light-emitting element according to an embodiment of the present disclosure.

As an example, in a specific implementation, with reference to FIG. 3, a diameter of the body structure 11 is 38 mm, and eight first light-emitting elements 101 are disposed on the body structure 11, wherein five of the first light-emitting elements 101 are disposed at a top edge of the body structure 11, and the remaining three first light-emitting elements 101 are disposed on a peripheral side of the body structure 11, and projections of the eight first light-emitting elements 101 on a plane which is perpendicular to a central axis of the accessory body 1 do not overlap each other.

Specifically, with reference to FIG. 3 to FIG. 6, the eight first light-emitting elements 101 are respectively defined as a light-emitting element 1011, a light-emitting element 1012, a light-emitting element 1013, a light-emitting element 1014, a light-emitting element 1015, a light-emitting element 1016, a light-emitting element 1017 and a light-emitting element 1018 for ease of description. Among them, the light-emitting elements 1011, 1012, 1013, 1014 and 1015 are disposed at the top edge of the body structure 11, and the light-emitting elements 1016, 1017 and 1018 are disposed on the peripheral side of the body structure 11, and moreover, the light-emitting element 1016 is located between the light-emitting element 1011 and the light-emitting element 1012, the light-emitting element 1017 is located between the light-emitting element 1011 and the light-emitting element 1015, and the light-emitting element 1018 is located between the light-emitting element 1012 and the light-emitting element 1013.

With reference to FIG. 3, a connecting line between the light-emitting elements 1011 and 1012 is 22.52 mm long, a connecting line between the light-emitting elements 1012 and 1013 is 20.72 mm long, a connecting line between the light-emitting elements 1013 and 1014 is 13.32 mm long, a connecting line between the light-emitting elements 1014 and 1015 is 13.32 mm long, and a connecting line between the light-emitting elements 1015 and 1011 is 22.52 mm long. The connecting line between the light-emitting elements 1011 and 1012 forms an angle of 94.43° with the connecting line between the light-emitting elements 1012 and 1013, the connecting line between the light-emitting elements 1012 and 1013 forms an angle of 114.72° with the connecting line between the light-emitting elements 1013 and 1014, the connecting line between the light-emitting elements 1013 and 1014 forms an angle of 130.57° with the connecting line between the light-emitting elements 1014 and 1015, the connecting line between the light-emitting elements 1014 and 1015 forms an angle of 110.29° with the connecting line between the light-emitting elements 1015 and 1011, and the connecting line between the light-emitting elements 1015 and 1011 forms an angle of 90° with the connecting line between the light-emitting elements 1011 and 1012.

Figure 4:
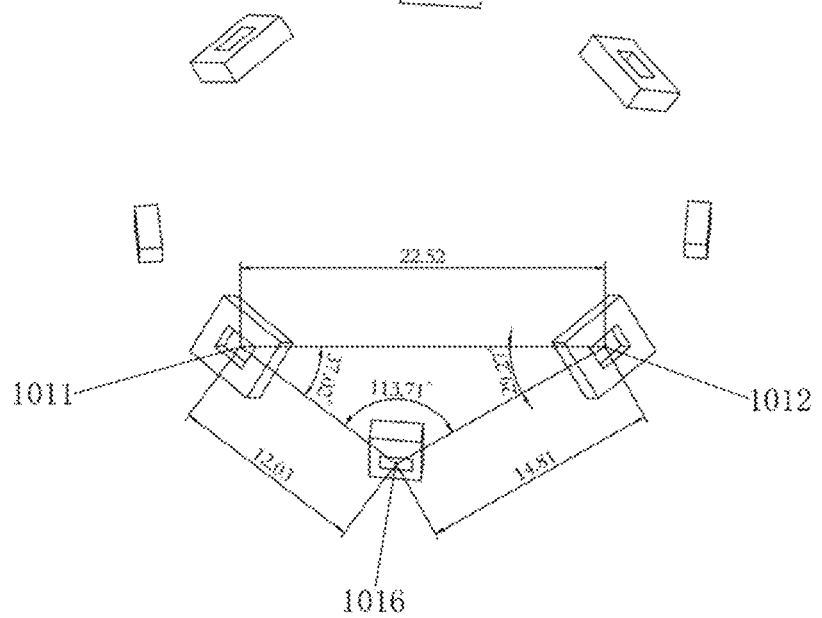
FIG. 4 illustrates a schematic diagram of a second arrangement of a first light-emitting element according to an embodiment of the present disclosure.

With reference to FIG. 4, a connecting line between the light-emitting elements 1011 and 1016 is 12.03 mm long, and a connecting line between the light-emitting elements 1016 and 1012 is 14.81 mm long. The connecting line between the light-emitting elements 1011 and 1016 forms an angle of 37.02° with the connecting line between the light-emitting elements 1011 and 1012, the connecting line between the light-emitting elements 1011 and 1016 forms an angle of 113.71° with the connecting line between the light-emitting elements 1016 and 1012, and the connecting line between the light-emitting elements 1016 and 1012 forms an angle of 29.27° with the connecting line between the light-emitting elements 1011 and 1012.

Figure 5:
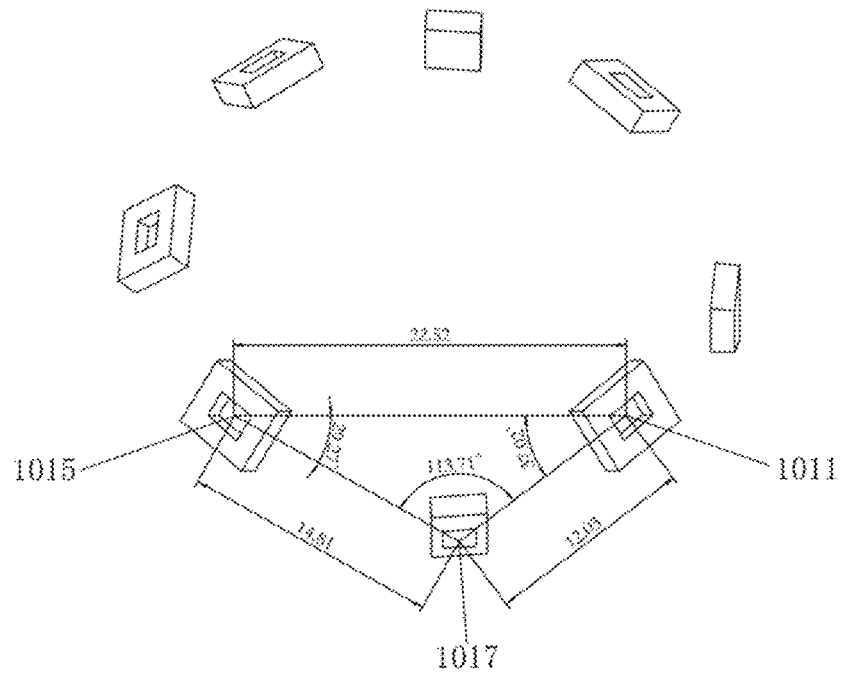
FIG. 5 illustrates a schematic diagram of a third arrangement of a first light-emitting element according to an embodiment of the present disclosure.

With reference to FIG. 5, a connecting line between the light-emitting elements 1015 and 1017 is 14.81 mm long, and a connecting line between the light-emitting elements 1011 and 1017 is 12.03 mm long. The connecting line between the light-emitting elements 1015 and 1017 forms an angle of 113.71° with the connecting line between the light-emitting elements 1017 and 1011, the connecting line between the light-emitting elements 1011 and 1017 forms an angle of 37.02° with the connecting line between the light-emitting elements 1011 and 1015, and the connecting line between the light-emitting elements 1015 and 1016 forms an angle of 29.27° with the connecting line between the light-emitting elements 1015 and 1011.

It is to be noted that a triangle formed by the light-emitting elements 1011, 1012 and 1016 and a triangle formed by the light-emitting elements 1015, 1017 and 1011 have different positions when viewed from the same angle of view, even though the lengths of the three edges are 22.52 mm, 14.81 mm and 12.03 mm, respectively. Therefore, these two triangles are not the same.

Figure 6:
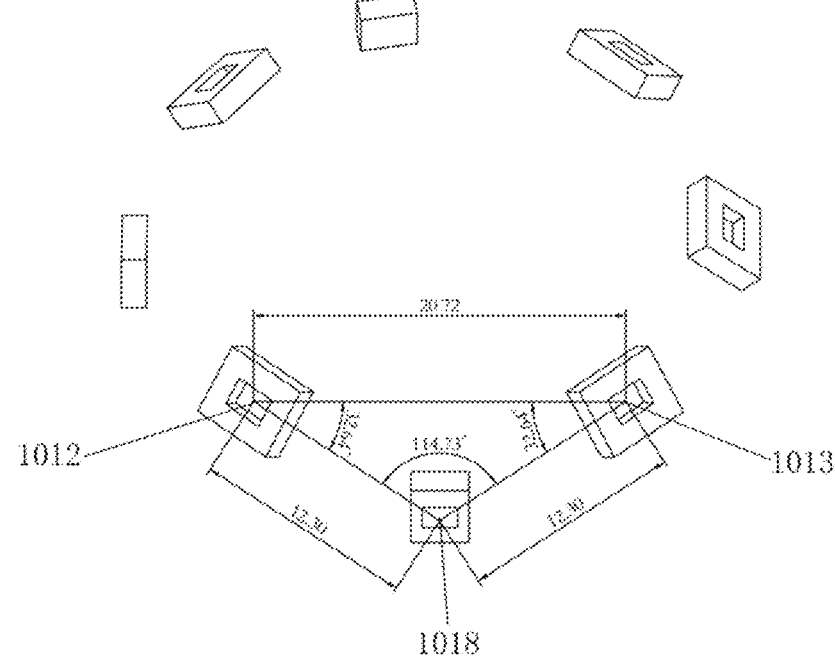
FIG. 6 illustrates a schematic diagram of a fourth arrangement of a first light-emitting element according to an embodiment of the present disclosure.

With reference to FIG. 6, a connecting line between the light-emitting elements 1012 and 1018 is 12.30 mm long, and a connecting line between the light-emitting elements 1018 and 1013 is 12.30 mm long. The connecting line between the light-emitting elements 1012 and 1018 forms an angle of 114.73° with the connecting line between the light-emitting elements 1018 and 1013, the connecting line between the light-emitting elements 1012 and 1018 forms an angle of 32.64° with the connecting line between the light-emitting elements 1012 and 1013, and the connecting line between the light-emitting elements 1018 and 1013 forms an angle of 32.64° with the connecting line between the light-emitting elements 1013 and 1012.

To sum up, the eight first light-emitting elements 101 are arranged on the body structure 11 such that at least three adjacent first light-emitting elements 101 can be seen at any viewing angle in a circumferential or top-down view of the body structure 11, and any three adjacent first light-emitting elements 101 form different triangles. Of course, the arrangement of the eight first light-emitting elements 101 may further be adjusted in view of actual needs.

Figure 7:
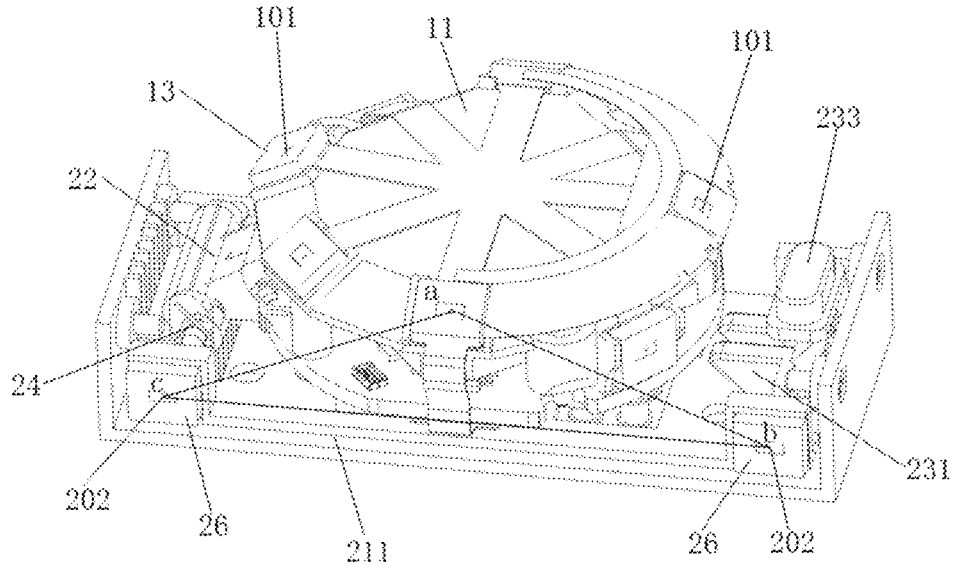
FIG. 7 illustrates a schematic diagram of inner structure of the accessory according to an embodiment of the present disclosure.
Figure 8:
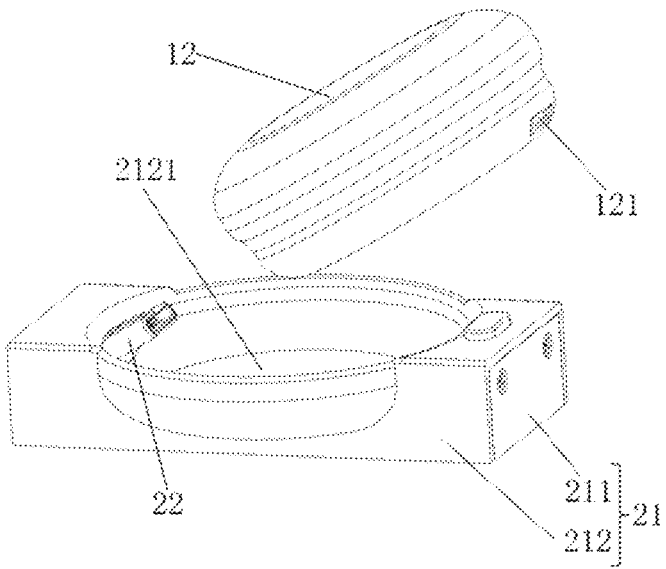
FIG. 8 illustrates a schematic diagram of disassembly of the accessory according to an embodiment of the present disclosure.

As shown in FIGS. 7 and 8, an embodiment of the present disclosure further provides an accessory, the accessory comprising the above-described accessory body 1 and an accessory base 2.

With reference to FIG. 8, in some embodiments, the accessory base 2 is connected to the accessory body 1, at least one second light-emitting element 202 is disposed on the accessory base 2, and connecting lines between the at least one second light-emitting element 202 and the at least one first light-emitting element 101 form a second polygon.

It may be understood that by disposing the second light-emitting element 202 on the accessory base 2, connecting lines between the at least one second light-emitting element 202 and the at least one first light-emitting element 101 form a second polygon, so that when the accessory base 2 is connected to the accessory body 1, tracking and positioning of the accessory may be performed jointly by the first light-emitting element 101 on the accessory body 1 and the second light-emitting element 202 on the accessory base 2.

In some embodiments, the accessory base 2 at least comprise a first side and a second side, and the first side and the second side are disposed opposite to each other, and the first side and the second side each correspond to at least one second light-emitting element 202, wherein connecting lines between the at least one second light-emitting element 202 of the first side and the at least one first light-emitting element 101 form a second polygon, and connecting lines between the at least one second light-emitting element 202 of the second side and the at least one first light-emitting element 101 form another second polygon, and the two second polygons have the same size and shape.

That is, the second light-emitting elements 202 on the accessory base 2 and the first light-emitting elements 101 on the accessory body 1 may form two second polygons which have the same size and shape, on the first side and the second side of the accessory base 2. As such, the accessory may be worn in various ways, and the tracking and positioning of the accessory may be realized on both the first side and the second side of the accessory base 2. In other words, there exist two directions, and the user does not have to care about the mounting direction of the accessory body 1 and/or the accessory base 2; the accessory body 1 and the accessory base 2 can form two identical second polygons on the first side and on the second side no matter how they are mounted, and the algorithms for tracking the accessory remain the same.

As an example, in a specific implementation, at least two second light-emitting elements 202 of the first side of the accessory base 2 and one first light-emitting element 101 form a second polygon. Only with one first light-emitting element 101, a distance between two adjacent second light-emitting elements 202 on the accessory base 101 can be increased, so that the shortest edge of the second polygon is longer than the longest edge of any first polygon. In this way, the long-distance tracking and positioning of the accessory can be realized by the second light-emitting element 202 on the accessory base 2 in cooperation with the first light-emitting element 101 on the accessory body 1. With the first light-emitting element 101 on the accessory body 1, proximity tracking and positioning can be realized, improving the problem of the spot adhesion in the long-distance tracking and positioning of the accessory.

As an example, in a specific implementation, with reference to FIG. 7, two second light-emitting elements 202 are disposed on each of the first side and the second side of the accessory base 2 respectively, and a triangle formed by connecting lines between the two second light-emitting element 202 of the first side and one of the first light-emitting elements 101 and a triangle formed by connecting lines between the two second light-emitting element 202 of the second side and one of the first light-emitting elements 101 have the same size and shape.

It may be understood that the two second light-emitting elements 202 on the first side and the two second light-emitting elements 202 on the second side of the accessory base 2 are symmetrically disposed about a reference plane, and the two first light-emitting elements 101 involved in forming the second polygon are also symmetrically disposed about the above reference plane, so that the two second polygons formed have the same size and shape.

It is to be noted that the light-emitting elements 1012 and 1015 are symmetrically disposed about the body structure 11, wherein the light-emitting element 1015 and the two second light-emitting elements 202 on the first side of the accessory base 2 form a triangle, and the light-emitting element 1012 and the two second light-emitting elements 202 on the second side of the accessory base 2 form a triangle, and these two triangles have the same shape and size.

With reference to FIG. 7, in some embodiments, a second light concentrator 26, corresponding to each second light-emitting element 202, is disposed on the accessory base 2, and the second light concentrator 26 has a light concentrating cavity for concentrating light.

It may be understood that the second light-emitting element 202 is disposed within the light concentrating cavity of the second light concentrator 26. Light emitted from the second light-emitting element 202 can be concentrated through the light concentrating cavity, and the light spot formed by the second light-emitting element 202 is avoided from being too large and affecting the tracking and position, which helps to increase the accuracy of tracking and positioning of the second light-emitting element 202.

As an example, in a specific implementation, the second light concentrator 26 may be optionally foam with grooves.

As an example, in a specific implementation, the accessory may be a wearable device such as a body tracker, the first light-emitting element 101 is disposed on the accessory body 1, and the second light-emitting element 202 is disposed on the accessory base 2. The accessory body 1 may be used in conjunction with the accessory base 2 so as to be bound to the user's legs, waist, arms and other position. The accessory body 1 may further be used alone as a gaming peripheral on equipment such as baseball bats, ping pong paddles, etc.

Figure 9:
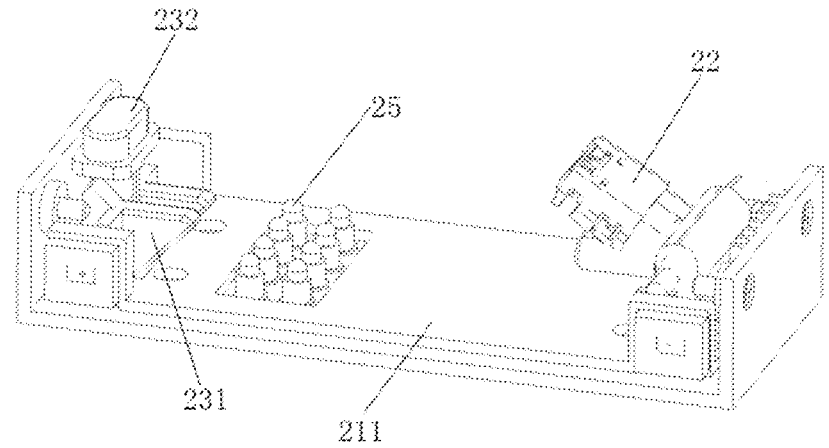
FIG. 9 illustrates a schematic diagram of local structure of an accessory base according to an embodiment of the present disclosure.

As shown in FIGS. 8 and 9, in some embodiments, the accessory base 2 comprises an outer casing 211 and an inner casing 212 which are connected to each other, a mounting cavity 201 is formed between the outer casing 211 and the inner casing 212, and the second light-emitting element 202 is located within the mounting cavity 201.

Specifically, the outer casing 211 is a U-shaped structure. Two sides of the U-shaped structure in its width direction are the first side and the second side of the accessory base 2, respectively. The two second light-emitting elements 202 on each of the first side and the second side are disposed on two ends of the U-shaped structure in a length direction. The second light-emitting elements on the first side and the second side are symmetrically disposed in the width direction of the U-shaped structure, such that it helps to guarantee the consistency of the second polygons formed by the first light-emitting elements 101 on the accessory body 1 and the second light-emitting elements 202 on the first side and the second side.

Further, the inner casing 212 is also a U-shaped structure, the inner casing 212 and the outer casing 211 are snap-on-connected to form the accessory base 2, and the mounting cavity 201 is formed between the inner casing 212 and the outer casing 211.

It is to be noted that the second light-emitting element 202 and the second light concentrator 26 are both mounted on the outer casing 211, and the inner casing 212 allows light emitted from the second light-emitting element 202 to pass through.

As an example, in a specific implementation, the second light-emitting element 202 is an infrared lamp, and then the inner casing 212 allows infrared light to pass through. Or light emitted by the second light-emitting element 202 may further be visible light, or invisible light other than infrared light, such as near-infrared light, etc., at which point the inner casing 212 is correspondingly disposed based on the characteristics of the light emitted by the second light-emitting element 202.

In some embodiments, the accessory body 1 and the accessory base 2 are detachably connected, and at least part of a peripheral side of the accessory body 1 is exposed. In this way, after the accessory base 2 and the accessory body 1 are connected, light can be easily emitted from the first light-emitting element 101, and the accessory base 2 is prevented from blocking the light from the first light-emitting element 101.

It is to be noted that the accessory body 1 and accessory base 2 are detachably connected in various ways, such as by screw connection, magnetic connection, snap-on connection, etc.

As shown in FIGS. 8 to 11, in some embodiments, a first plug-in connector 111 and a first snap-on connector 121 are disposed on the accessory body 1; the accessory base 2 comprises a base body 21, and a second plug-in connector 22 and a snap-on connection structure 23, and the second plug-in connector 22 is rotatably disposed on the base body 21 and is capable of being plug-in-connected to the first plug-in connector 111, and the snap-on connection structure 23 is capable of being snap-on-connected to the first snap-on connector 121 or disengaged from snap-on-connection with the first snap-on connector 121. In a case that the first plug-in connector 111 and the second plug-in connector 22 are plug-in-connected, the accessory body 1 is pressed to cause the second plug-in connector 22 to rotate such that the first snap connector 121 is snap-on-connected with the snap-on connection structure 23.

It may be understood that by disposing the first plug-in connector 111 and the first snap-on connector 121 on the accessory body 1, the accessory base 2 comprises the second plug-in connector 22 which is rotatably disposed on the base body 21 and the snap-on connector structure 23 which is capable of being snap-on-connected to the first snap-on connector 121 or disengaged from snap-on-connection with the first snap-on connector 121. In a case that the first plug-in connector 111 and the second plug-in connector 22 are plug-in-connected, the accessory body 1 is pressed to cause the second plug-in connector 22 to rotate such that the first snap connector 121 is snap-on-connected with the snap-on connection structure 23. In this way, the accessory body 1 and the accessory base 2 are used integrally through plug-in-connection and snap-on-connection, and may further be disengaged from snap-on-connection through the first snap-on connector 121 and the snap-on connection structure 23; the first plug-in connector 111 and the second plug-in connector 22 are disengaged from plug-in-connection to detach the accessory body 1 and the accessory base 2, so that the accessory body 1 can be used separately, expanding application scenarios.

In some embodiments, the first plug-in connector 111 and the second plug-in connector 22 are both electrical connectors, and the electrical connectors are configured to implement signal transmission and/or electrical transmission between the accessory body 1 and the accessory base 2.

The first plug-in connector 111 and the second plug-in connector 22 may be plug-in connectors which distinguish between male and female and are capable of simultaneous electrical connection, such as USB, Type-C, etc. Or the first plug-in connector 111 and the second plug-in connector 22 may be plug-in connectors which do not distinguish between male and female and are capable of electrical connection, such as Anderson plugs, etc.

Figure 10:
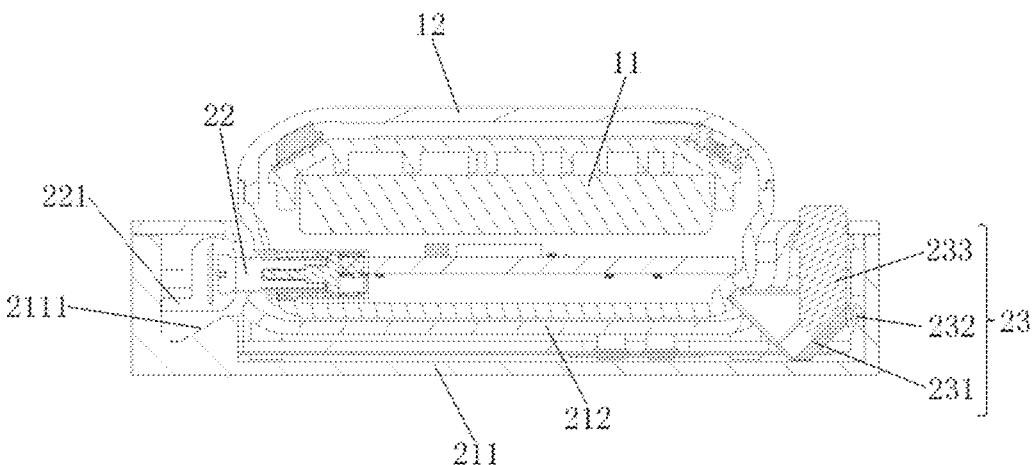
FIG. 10 illustrates a first exploded schematic diagram of a wearable device according to an embodiment of the present disclosure.

As an example, in a specific implementation, with reference to FIGS. 9 and 10, the second plug-in connector 22 is an electrical connector, e.g., a Type-C male connector, and the first plug-in connector 111 is also an electrical connector, e.g., a Type-C female socket. After the first plug-in connector 111 and the second plug-in connector 22 are plug-in-connected, not only plug-in-connection but also electrical transmission and signal transmission between the accessory body 1 and the accessory base 2 is realized. The first plug-in connector 111 is a Type-C male connector, and the second plug-in connector 22 is a Type-C female socket.

As an example, in a specific implementation, when the first plug-in connector 111 and the second plug-in connector 22 are electrical connectors, the first light-emitting element 101 or the second light-emitting element 202 realizes electrical transmission by the electrical connector. Thus, the arrangement of additional wiring can be eliminated, and the structure of the accessory body 1 and accessory base 2 can be simplified.

Optionally, in other embodiments, connectors 25 are disposed on both the accessory base 2 and the accessory body 1, and in a case that the first snap-on connector 121 and the snap-on connection structure 23 are snap-on-connected, the two connectors 25 implement signal transmission and/or electrical transmission between the accessory body 1 and the accessory base 2.

The above connector 25 may be a wired transmission structure or a wireless transmission structure which is capable of implementing signal transmission, the wired transmission structure may be, for example, pogopin, etc., and the wireless transmission structure may be, for example, NFC, RFID, bluetooth, etc. Or the connector 25 may further be a structure capable of electrical transmission, such as wired electrical connection or wireless charging, etc.

As an example, in a specific implementation, the first light-emitting element 101 or the second light-emitting element 202 may realize electrical transmission by the connector 25, so as to supply power to the first light-emitting element 101 and/or the second light-emitting element 202. In this case, the first plug-in connector 111 and the second plug-in connector 22 cooperate to achieve only plug-in connection between the accessory body 1 and the accessory base 2, without having the function of electrical transmission and signal transmission. For example, one of the first plug-in connector 111 and the second plug-in connector 22 is a plug-in-connection post and the other is a plug-in-connection hole, at which time the first plug-in connector 111 and the second plug-in connector 22 only realize structural plug-in connection when being plug-in-connected. Or the first plug-in connector 111 and the second plug-in connector 22 further have the function of electrical transmission and/or signal transmission.

As an example, in another specific implementation, the first light-emitting element 101 and/or the second light-emitting element 202 may realize electrical transmission by the first plug-in connector 111 and the second plug-in connector 22, while the connector 25 does not have the function of electrical transmission or signal transmission or has the function of electrical transmission and/or signal transmission.

It may be understood that when the first plug-in connector 111 cooperates with the second plug-in connector 22 and further the connector 25 exists, the electrical and/or signal transmission between the accessory body 1 and the accessory base 2 can be made more flexible, and a connection with better electrical characteristics may be selected.

As an example, in a specific implementation, with reference to FIG. 9, the connector 25 on the accessory body 1 is located on the bottom surface of the accessory body 1, i.e., on a surface of the accessory body 1 which contacts with the base body 21 when the first snap-on connector 121 and the snap-on connection structure are snap-on-connected. The connector 25 on the accessory base 2 is disposed corresponding to the position of the connector on the accessory body 1. In this way, after the accessory body 1 and the accessory base 2 are assembled, the two connectors 25 are connected, which facilitates operation. Moreover, the accessory body 1 and the accessory base 2 may block the two connectors 25 to protect the connectors 25.

In some embodiments, at least one of the accessory body 1 and the accessory base 2 is provided with a power supply member which is capable of supplying power to the first light-emitting element 101 and the second light-emitting element 202.

In a specific implementation, a power supply member may be disposed on the accessory base 2. When the first snap-on connector 121 and the second snap-on connector 231 are snap-on-connected, the power supply member and the first light-emitting element 101 are electrically connected, and the power supply member supplies power to the first light-emitting element 101. Or a power supply member may be disposed on the accessory body 1. When the first snap-on connector 121 and the second snap-on connector 231 are snap-on-connected, the power supply member and the second light-emitting element 202 are electrically connected, and the power supply member supplies power to the second light-emitting element 202. Or power supply members may be disposed on both the accessory body 1 and the accessory base 2, wherein the power supply member on the accessory body 1 supplies power to the first light-emitting element 101, and the power supply member on the accessory base 2 supplies power to the second light-emitting element 202.

It is to be noted that one of the first snap-on connector 121 and the snap-on connection structure 23 may be a snap-on protrusion, and the other is a snap-on hole, and when the accessory body 1 is pressed, the snap-on protrusion is deformed to be inserted into the snap-on hole. Or both the first snap-on connector 121 and the snap-on connection structure 23 may be snap-on protrusions, and at least one of the two snap-on protrusions may be deformed to realize snap-on connection or be disengaged from snap-on connection.

Figure 11:
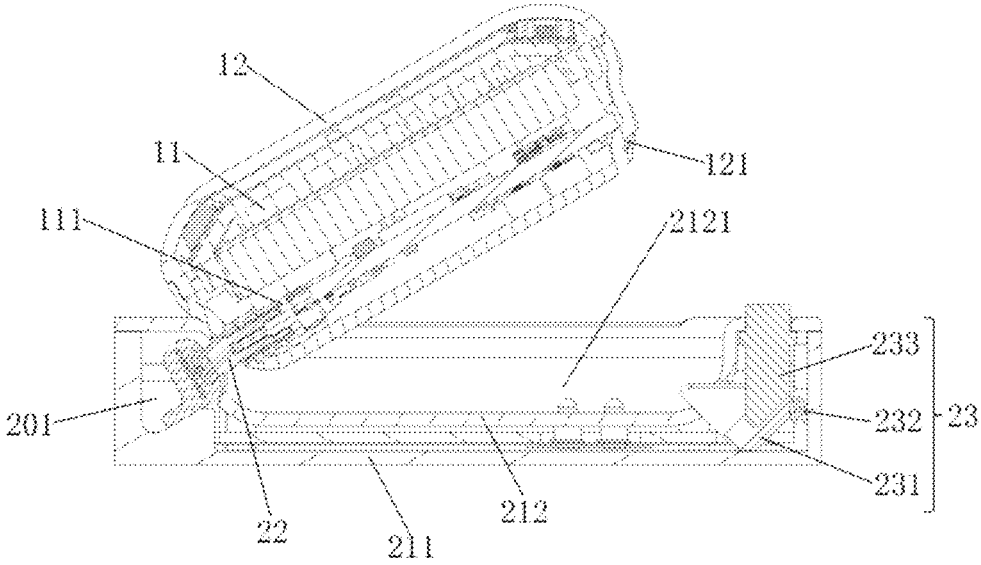
FIG. 11 illustrates a second exploded schematic diagram of a wearable device according to an embodiment of the present disclosure.

As shown in FIGS. 9 to 11, in some embodiments, the snap-on connection structure 23 comprises a second snap-on connector 231 and a driving component, and the second snap-on connector 231 is slidably disposed on the base body 21, and the second snap-on connector 231 comprises a snap-on connection position capable of being snap-on-connected with the first snap connector 121 and an unlocking position capable of being released from the snap-on connection with the first snap connector 121, and the driving component is capable of driving the first snap connector 121 to switch between the snap-on connection position and the unlocking position.

It may be understood that through the cooperation between the driving component and the second snap-on connector 231, the second snap-on connector 231 and the first snap-on connector 121 may be snap-on-connected or disengaged from snap-on connection, so that the accessory body 1 can be disassembled from the accessory base 2 for use alone.

In some embodiments, the driving component comprises a first elastic part 232, one end of the first elastic part 232 is connected to the base body 21, and another end is connected to the second snap-on connector 231, and the second snap-on connector 231 is located at the snap-on connection position in a natural state.

It may be understood that in a natural state, the second snap-on connector 231 is at the snap-on connection position. That is, when the accessory body 1 and the accessory base 2 are connected integrally, the second snap-on connector 231 and the first snap-on connector 121 are in a snap-on-connection state. By arranging the first elastic part 232, a force can be exerted on the second snap-on connector 231, causing the first snap-on connector 121 and the second snap-on connector 231 to be stably snap-on-connected.

Further, a guiding arc is disposed on the first snap-on connector 121 or the second snap-on connector 231. When the accessory body 1 is pressed, the accessory body 1 can pass over the second snap-on connector 231 through the guiding arc and is snap-on-connected with the second snap-on connector 231.

That is, by arranging the guiding arc, the accessory body 1 can slide along the guiding arc when being pressed, which reduces reducing friction and makes it easy for the accessory to pass over the second snap-on connector 231. Furthermore, during the accessory body 1 sliding along the guiding arc, the second snap-on connector 231 compresses the first elastic part 232, so that after the accessory body 1 passes over the guiding arc, the force restoring the first elastic part 232 to its original state pushes the second snap-on connector 231 to press against the first snap-on connector 121, realizing the snap-on connection between the first snap-on connector 121 and the second snap-on connector 231. Therefore, after the accessory body 1 and the accessory base 2 are plug-in-connected through the first plug-in connector 111 and the second plug-in connector 22, the snap-on connection between the accessory body 1 and the accessory base 2 can be realized simply by pressing the accessory body 1 through the movement of the first elastic part 232, without the need of any additional operation.

As an example, in a specific implementation, with reference to FIGS. 10 and 11, a guiding arc is disposed on the second snap-on connector 231, and the accessory body 1, when being pressed, slides along the guiding arc on the second snap-on connector 231 and pushes the second snap-on connector 231 to compress the first elastic part 232.

As an example, in a specific implementation, with reference to FIGS. 8, 10 and 11, the first snap-on connector 121 is a snap-on hole, and when the first snap-on connector 121 and the second snap-on connector 231 are snap-on-connected, the second snap-on connector 231 protrudes into the snap-on hole. Or the first snap-on connector 121 may further be a protrusion disposed on the accessory body 1.

In addition, it is to be noted that the foregoing snap-on hole is disposed on the light-transmitting cover 12.

Further, the driving component further comprises a driving part 233, and the driving part 233 comprises a first inclined plane, and the second snap-on connector 231 comprises a second inclined plane fitting with the first inclined plane; and the driving part 233, in a case that moving downward along the second inclined plane, is capable of causing the second snap connector 231 to move from the snap-on connection position to the unlocking position and compress the first elastic part 232.

That is, when the first snap-on connector 121 and the second snap-on connector 231 are snap-on-connected, the second snap-on connector 231 is located at the snap-on connection position. If it is necessary to detach the accessory body 1 and the accessory base 2, then the driving part 233 may be driven to move downward along the second inclined plane, causing the second snap-on connector 231 to move from the snap-on connection position to the unlocking position and compress the first elastic part 232. After the second snap-on connector 231 and the first snap-on connector 121 are disengaged from the snap-on connection, the accessory body 1 may be detached, and after the driving part 233 is no longer driven by the external force, the force restoring the first elastic part 232 to its original state will drive the second snap-on connector 231 to move from the unlocking position to the snap-on connection position, in which course the driving part 233 moves upward along the second inclined plane.

It is to be noted that to improve the snap-on connection effect of the first snap-on connector 121 and the second snap-on connector 231, the first elastic part 232 may be set to be in a compression state when the second snap-on connector 231 is located at the snap-on connection position. In this way, the elasticity of the first elastic part 232 may be utilized to enhance the force between the second snap-on connector 231 and the first snap-on connector 121, increasing the stability of the snap-on connection.

Further, as shown in FIGS. 10 and 11, the base body 21 comprises a mounting cavity 201, the first elastic part 232 is disposed within the mounting cavity 201, one end of the driving part 233 having the first inclined plane is located within the mounting cavity, the other end is located outside the mounting cavity, and the second inclined plane on the second snap-on connector 231 is located within the mounting cavity 201.

That is, when it is necessary to detach the accessory body 1 and the accessory base 2, the end of the driving part 233 which is outside the mounting cavity 201 is pressed to cause the driving part 233 to move downward along the second inclined plane, thereby driving the second snap-on connector 231 to move within the mounting cavity 201 from the snap-on connection position to the unlocking position. This facilitates operation.

As shown in FIGS. 10 and 11, in some embodiments, the base body 21 comprises an accommodating cavity 2121 which is capable of accommodating the accessory body 1, and part of the second plug-in connector 22 is located within the accommodating cavity 2121. When the second snap-on connector 231 is located at the snap-on connection position, part of the second snap-on connector 231 is located within the accommodating cavity 2121. By arranging the accommodating cavity 2121, protection is provided to the accessory body 1, and the overall thickness of the accessory can be reduced to some extent, which is conducive to the miniaturised design of the accessory.

Specifically, the guiding arc on the second snap-on connector 231 is located within the accommodating cavity 2121 when the second snap-on connector 231 is at the snap-on connection position.

As an example, in a specific implementation, the depth of the accommodating cavity 2121 may be set as less than the height of the accessory body 1. In this way, the top of the accessory body 1 is made to be exposed from the accessory base 2, making it convenient to track the light-emitting portion in the accessory body 1 and grip the accessory body 1 when detaching the accessory body 1 and the accessory base 2. In addition, the top of the accessory body 1 is exposed out of the accessory base 2, which facilitates cleaning the accessory body 1. Or the depth of the accommodating cavity 2121 may further be set equal to the height of the accessory body 1, so as to fully wrap the side of the accessory body 1 and improve the protection effect for the accessory body 1.

In some embodiments, in the height direction of the accessory body 1, both the first plug-in connector 111 and the first snap-on connector 121 are located at a height which is less than half of the height of the accessory body 1.

That is, both the first plug-in connector 111 and the first snap-on connector 121 are both below half the height of the accessory body 1, which is conducive to setting the depth of the accommodating cavity 2121 less than the height of the accessory body 1 so as to expose the upper part after the accessory body 1 is connected to the accessory base 2. In this way, it is easy to hold the upper part of the accessory body 1 for insertion or removal, which also saves material for mounting the accessory base 2, and facilitates the exposure of the first light-emitting element 101 on the accessory body 1 and further facilitates the tracking of the first light-emitting element 101 on the accessory body 1.

As shown in FIGS. 8, 10 and 11, the inner casing 212 of the base body 21 comprises the above accommodating cavity 2121, and the inner casing 212 is provided with a first penetration hole for the second plug-in connector 22 to penetrate and a second penetration hole for the second snap-on connector 231 to penetrate.

That is, the base body 21 is composed of the outer casing 211 and the inner casing 212, and the inner casing 212 comprises the above accommodating cavity 2121. In addition, the above-described mounting cavity 201 is formed between the outer casing 211 and inner casing 212, thereby providing mounting space for the snap-on connection structure 23.

It is to be noted that in this case, when the accessory body 1 and the accessory base 2 are connected through the connector 25, the connector 25 is disposed on the outer casing 211, and the inner casing 212 is provided with a hole for the connector 25 on the accessory body 1 to pass through or for the connector 25 on the accessory base 2 to protrude into the accommodating cavity 2121. In this way, after the accessory body 1 and the accessory base 2 are assembled, the two connectors 25 may be prevented from being exposed, which is not only aesthetically pleasing, but also protects the connectors 25.

As shown in FIGS. 9 to 11, in some embodiments, the accessory base 2 further comprises a second elastic part 24, and the second elastic part 24 is deformed and provides a lifting force for the second plug-in connector 22 to rotate to lift the accessory body 1 in a direction away from the accessory base 2.

That is, when the first snap-on connector 121 and the second snap-on connector 231 are released from the snap-on connection, under the action of the second elastic part 24, the second plug-in connector 22 will lift the accessory body 1 in a direction away from the accessory base 2. Thus, during detaching the accessory body 1 and the accessory base 2, after the first snap-on connector 121 and the second snap-on connector 231 are released from the snap-on connection, the accessory body 1 is lifted by the second plug-in connector 22, which makes it convenient for the accessory body 1 and the accessory base 2 to release from the plug-in connection and for the accessory body 1 to be detached from the second plug-in connector 22.

Further, the second plug-in connector 22 is rotatably connected to the base body 21 through a rotation shaft.

As an example, in a specific implementation, the second elastic part 24 is optionally a torsion spring, the second elastic part 24 is sleeved on the rotation shaft, and two free ends of the torsion spring are connected to or abut against the second plug-in connector 22 and the base body 21 respectively. During the assembly process of the accessory body 1 and the accessory base 2, the accessory body 1 is pressed to cause the second plug-in connector 22 to rotate, and at this point the second elastic part 24 generates elastic deformation. After the first snap-on connector 121 and the second snap-on connector 231 are released from the snap-on connection, the force restoring the second elastic part 24 to its original state drives the second plug-in connector 22 to rotate counterclockwise to lift the accessory body 1 in a direction away from the accessory base 2.

As an example, in another specific implementation, the second elastic part 24 is also optionally a cylindrical spring, one end of the cylindrical spring is connected to the base body 1, and the other end thereof is connected to the second plug-in connector 22. When the second snap-on connector 231 and the first snap-on connector 121 are snap-on-connected, the cylindrical spring is stretched. When the second snap-on connector 231 and the first snap-on connector 121 are released from the snap-on connection, the force restoring the cylindrical spring to its original state causes the second plug-in connector 22 to rotate and lift the accessory body 1.

It is to be noted that the second plug-in connector 22 comprises a first position and a second position under the action of the second elastic part 24, and the second plug-in connector 22 is at the first position in a natural state. When the second snap-on connector 231 and the first snap-on connector 121 are released from the snap-on connection, the second plug-in connector 22, under the action of the second elastic part 24, moves from the second position to the first position to lift the accessory body 1. When the second plug-in connector 22 is at the first position and is plug-in-connected to the first plug-in connector 111, the accessory body 1 is pressed in a direction close to the accessory base 2, causing the second plug-in connector 22 to rotate and causing the second snap-on connector 231 and the first snap-on connector 121 to be snap-on-connected. At this point, the second plug-in connector 22 is at the second position, and the second elastic part 24 is deformed and generates a force to drive the second plug-in connector 22 to move from the second position to the first position.

Specifically, with reference to FIG. 10, when the second snap-on connector 231 is snap-on-connected to the first snap-on connector 121, i.e., the second snap-on connector 231 is at the snap-on connection position, the second plug-in connector 22 is at the second position, at which point the second plug-in connector 22 and the bottom surface of the accommodating cavity 2121 form a first preset angle. With reference to FIG. 11, when the second plug-in connector 22 is at the first position, the second plug-in connector 22 and the bottom surface of the accommodating cavity 2121 form a second preset angle, and the second preset angle is larger than the first preset angle.

As an example, in a specific implementation, the first preset angle is 0°. That is, the second plug-in connector 22, when being located at the first position, is parallel to the bottom surface of the accommodating cavity 2121. When the second preset angle is larger than 0° and less than 90°, the second plug-in connector 22 is at the second position, which makes it convenient for the second plug-in connector 22 and the first plug-in connector 111 on the accessory body 1 to be plug-in-connected or released from the plug-in connection.

Further, with reference to FIG. 10, a limiting portion 221 is disposed on the second plug-in connector 22, and a limiting surface 2111 is disposed on the base body 21, the limiting surface 2111 being used to limit the limiting portion 221 when the second plug-in connector 22 lifts the accessory body 1.

That is, when the second plug-in connector 22 lifts the accessory body 1 under the action of the second elastic part 24, the limiting portion 221 and the limiting surface 2111 cooperate to limit the position the second plug-in connector 22. Specifically, when the second plug-in connector 22 is at the first position, the limiting portion 221 abuts against the limiting surface 2111, i.e., the limiting surface 2111 and the limiting portion 221 cooperate to cause the second plug-in connector to stop rotation at the first position under the action of the second elastic part 24.

It is to be noted that the above limiting surface 2111 is disposed on the outer casing 211 and on the inside of the outer casing 211.

To sum up, the specific disassembly and assembly process of the accessory is explained in detail:

When the accessory body 1 and the accessory base 2 are not mounted, i.e., they are in a natural state respectively, the second plug-in connector 22 is at the first position, the second snap-on connector 231 is at the snap-on connection position, and the limiting portion 221 on the second plug-in connector 22 abuts against the limiting surface 2111.

1. When mounting the accessory body 1, first of all, the second plug-in connector 22 and the first plug-in connector 111 are plug-in-connected, at which point the second plug-in connector 22 is at the first position and supports the accessory body 1, as shown in FIG. 11. Subsequently, the accessory body 1 is pressed in a direction close to the accessory base 2 to cause the second plug-in connector 22 to rotate till the accessory body 1 contacts with the guiding arc of the second snap-on connector 231. Further, the accessory body 1 is pressed to cause the accessory body 1 pass over the guiding arc and cause the second snap-on connector 231 to be snap-on-connected to the first snap-on connector 121. At this point, the second plug-in connector 22 is at the second position, and the second snap-on connector 231 is at the snap-on connection, thereby realizing the mounting of the accessory body 1, just as shown in FIG. 10.

It is to be noted that while the accessory body 1 slides along the guiding arc, the second snap-on connector 231 moves towards the outside of the accommodating cavity 2121 and compresses the first elastic part 232; after the accessory body 1 passes over the guiding arc, the first elastic part 232 pushes the second snap-on connector 231 to move towards the inside of the accommodating cavity 2121 to cause the second snap-on connector to abut firmly against the first snap-on connector 121. During the process of pressing the accessory body 1 to cause the second plug-in connector 22 to rotate, the second elastic part 24 is deformed and generates a force which causes the second plug-in connector 22 to move from the second position to the first position.

2. When disassembling the accessory body 1, the driving part 233 is pressed so that the driving part 233 moves downward along the second inclined plane to drive the second snap-on connector 231 to move from the snap-on connection position to the unlocking position. After the second snap-on connector 231 and the first snap-on connector 121 are released from the snap-on connection, the second plug-in connector 22, under the action of the second elastic part 24, rotates from the second position to the first position so as to lift the accessory body 1 in a direction away from the accessory body 2, till the second plug-in connector 22 moves to the first position, just as shown in FIG. 11.

After the second plug-in connector 22 rotates to the first position, the accessory body 1 is disassembled from the second plug-in connector 22, thereby realizing the disassembly of the accessory body 1.

It is to be noted that during the process of the driving part 233 driving the second snap-on connector 231 to move from the snap-on connection position to the unlocking position, the second snap-on connector 231 compresses the first elastic part 232. When the driving part 233 loses the external force, the second snap-on connector 231 returns to the snap-on connection position under the action of the first elastic part 232, and the driving part 233 moves upward along the second inclined plane in this process. When the second plug-in connector 22 rotates to the first position, the limiting portion 221 on the second plug-in connector 22 abuts against the limiting surface 2111.

It is to be noted that relational terms used herein such as "first" and "second" are only used for distinguishing one entity or operation from another, and do not necessarily require or imply the existence of any such actual relationship or order between these entities or operations. Moreover, the terms "comprise", "include" or any other variant thereof are intended to cover non-exclusive inclusion, so that a process, method, article or device comprising a set of elements includes not only those elements, but also other elements that are not expressly listed or are inherent to such process, method, article or equipment. Without further limitation, an element defined by the phrase "comprising a . . . " does not exclude the existence of another identical element in the process, method, article or device including the element.

The specific implementations of the present disclosure have been described above, enabling those skilled in the art to understand or implement the present disclosure. Various modifications to these embodiments are apparent to those skilled in the art, and general principles defined herein may be realized in other embodiments without departing from the spirit or scope of the present disclosure. Therefore, the present disclosure will not be limited to these embodiments illustrated herein but accord with the broadest scope consistent with the principles and novel features disclosed herein.

We claim:

1. An accessory body, wherein a height of the accessory body is less than a contour diameter of a projection plane that is a projection of the accessory body on a plane which is perpendicular to a height direction of the accessory body, and the accessory body has at least eight first light-emitting elements, and light of the at least eight first light-emitting elements is emitted from a peripheral side of the accessory body, wherein the accessory body comprises a body structure, and two first light-emitting elements are disposed at a top edge of the body structure and a connecting line of the two first light-emitting elements is a diameter of a contour of the projection of the accessory body on the plane, and wherein at least three adjacent first light-emitting elements of the at least eight first light-emitting elements are visible at any viewing angle in a circumferential direction of the accessory body.

2. The accessory body of claim 1, wherein at least one of the following:

the accessory body is a disc-shaped structure, and the height of the accessory body is less than a diameter of the projection plane; or a first light concentrator is disposed on each first light-emitting element corresponding to the accessory body, and the first light concentrator has a light concentrating cavity for concentrating light.

3. The accessory body of claim 1, wherein an IMU sensor is disposed within the accessory body.

4. The accessory body of claim 1, wherein at least one of the following:

wherein at least one first light-emitting element other than the two first light-emitting elements is disposed at the top edge of the body structure, and a light emitting direction is inclined towards the peripheral side of the accessory body with respect to the height direction of the accessory body, or wherein at least one first light-emitting element is disposed on a peripheral side of the body structure.

5. The accessory body of claim 4, wherein the accessory body further comprises a light-transmitting cover, the light-transmitting cover covers the body structure.

6. The accessory body of claim 4, wherein shapes of first polygons formed by connecting lines of any at least three adjacent ones of the at least eight first light-emitting elements are different to each other; or the accessory body is used for connecting to an accessory base, wherein in a case that the accessory body is connected to the accessory base, shapes of first polygons formed by connecting lines of any at least three adjacent ones of the exposed first light-emitting elements are different from each other.

7. An accessory, comprising an accessory base and an accessory body, wherein a height of the accessory body is less than a contour diameter of a projection plane that is a projection of the accessory body on a plane which is perpendicular to a height direction of the accessory body, and the accessory body has at least eight first light-emitting elements, and light of the at least eight first light-emitting elements is emitted from a peripheral side of the accessory body, wherein the accessory body comprises a body structure, and two first light-emitting elements are disposed at a top edge of the body structure and a connecting line of the two first light-emitting elements is a diameter of a contour of the projection of the accessory body on the plane, and wherein at least three adjacent first light-emitting elements of the at least eight first light-emitting elements are visible at any viewing angle in a circumferential direction of the accessory body.

8. The accessory of claim 7, wherein the accessory base is connected to the accessory body, at least two second light-emitting elements are disposed on the accessory base, and connecting lines between the at least two second light-emitting elements and at least one first light-emitting element form a second polygon.

9. The accessory of claim 8, wherein the accessory base comprises at least a first side and a second side, and the first side and the second side are disposed opposite to each other, and the first side and the second side each correspond to at least two second light-emitting elements; and connecting lines between the at least two second light-emitting elements of the first side and the at least one first light-emitting element form a second polygon, and connecting lines between the at least two second light-emitting elements of the second side and the at least one first light-emitting element form another second polygon, and the two second polygons have the same size and shape.

10. The accessory of claim 8, wherein two second light-emitting elements are disposed on each of the first side and the second side respectively, a second polygon formed by connecting lines between the two second light-emitting element of the first side and one of the at least eight first light-emitting elements and a second polygon formed by connecting lines between the two second light-emitting element of the second side and one of the at least eight first light-emitting elements have the same size and shape.

11. The accessory of claim 10, wherein a second light concentrator is disposed on each second light-emitting element corresponding to the accessory base, and the second light concentrator has a light concentrating cavity for concentrating light.

12. The accessory of claim 7, wherein the accessory body and the accessory base are detachably connected, and at least part of a peripheral side of the accessory body is exposed.

13. The accessory of claim 7, wherein a first plug-in connector and a first snap-on connector are provided on the accessory body, and the accessory base comprises a base body, and a second plug-in connector and a snap-on connection structure, and the second plug-in connector is rotatably disposed on the base body and is capable of being plug-in-connected to the first plug-in connector, and the snap-on connection structure is capable of being snap-onconnected to the first snap-on connector or disengaged from snap-on-connection with the first snap-on connector; and in a case that the first plug-in connector and the second plug-in connector are plug-in-connected, the accessory body is pressed to cause the second plug-in connector to rotate such that the first snap connector is snap-on-connected with the snap-on connection structure.

14. The accessory of claim 13, wherein the first plug-in connector and the second plug-in connector are electrical connectors, and the electrical connectors are configured to implement at least one of signal transmission or electrical transmission between the accessory body and the accessory base; or connectors are disposed on both the accessory base and the accessory body, and in a case that the first snap connector and the snap connection structure are snap-on-connected, two connectors implement at least one of signal transmission or electrical transmission between the accessory body and the accessory base.

15. The accessory of claim 13, wherein the snap-on connection structure comprises a second snap-on connector and a driving component, and the second snap-on connector is slidably disposed on the base body, and the second snap-on connector comprise a snap-on connection position capable of being snap-on-connected with the first snap connector and an unlocking position capable of being released from the snap-on connection with the first snap connector, and the driving component is capable of driving the first snap connector to switch between the snap-on connection position and the unlocking position.

16. The accessory of claim 15, wherein the driving component comprises a first elastic part, one end of the first elastic part is connected to the base body, and another end is connected to the second snap-on connector, and the second snap-on connector is located at the snap-on connection position in a natural state.

17. The accessory of claim 16, wherein the driving component further comprises a driving part comprising a first inclined plane, and the second snap-on connector comprises a second inclined plane fitting with the first inclined plane.

18. The accessory of claim 17, wherein the driving part, in a case that moving downward along the second inclined plane, is capable of causing the second snap connector to move from the snap-on connection position to the unlocking position and compress the first elastic part.

19. The accessory of claim 13, wherein the accessory base further comprises a second elastic part, and the second elastic part is deformed and provides a lifting force for the second plug-in connector to rotate to lift the accessory body in a direction away from the accessory base.

20. The accessory body of claim 6, wherein the at least eight first light-emitting elements are disposed on the body structure, and shapes of triangles formed by connecting lines of any at least three adjacent ones of the at least eight first light-emitting elements are different from each other.

* * * * *